(12) United States Patent
Morita

(10) Patent No.: US 7,475,283 B2
(45) Date of Patent: *Jan. 6, 2009

(54) ANOMALY NOTIFICATION CONTROL IN DISK ARRAY

(75) Inventor: Seiki Morita, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/717,020

(22) Filed: Mar. 13, 2007

(65) Prior Publication Data

US 2007/0168709 A1 Jul. 19, 2007

Related U.S. Application Data

(63) Continuation of application No. 11/490,100, filed on Jul. 21, 2006, which is a continuation of application No. 10/827,325, filed on Apr. 20, 2004, now Pat. No. 7,103,798.

(30) Foreign Application Priority Data

Feb. 4, 2004 (JP) ............................. 2004-027490

(51) Int. Cl.
*G06F 11/00* (2006.01)
(52) U.S. Cl. .............................. 714/7; 714/6
(58) Field of Classification Search .............. 714/6, 714/7; 719/325
See application file for complete search history.

(56) References Cited

U.S. PATENT DOCUMENTS

| 4,754,397 | A | * | 6/1988 | Varaiya et al. ............... 361/685 |
| 5,423,046 | A | | 6/1995 | Nunnelley et al. |
| 5,475,814 | A | | 12/1995 | Tomimitsu |
| 5,546,558 | A | | 8/1996 | Jacobson et al. |
| 5,603,003 | A | | 2/1997 | Akizawa et al. |
| 5,691,948 | A | | 11/1997 | Sakabe |
| 5,727,144 | A | * | 3/1998 | Brady et al. ................... 714/6 |
| 5,805,788 | A | | 9/1998 | Johnson |
| 5,809,316 | A | | 9/1998 | Gouzu |
| 5,812,754 | A | | 9/1998 | Lui et al. |
| 5,822,782 | A | | 10/1998 | Humlicek et al. |
| 5,832,204 | A | | 11/1998 | Apperley et al. |
| 5,838,891 | A | | 11/1998 | Mizuno et al. |
| 5,845,319 | A | * | 12/1998 | Yorimitsu ................... 711/114 |
| 5,848,282 | A | | 12/1998 | Kang et al. |

(Continued)

FOREIGN PATENT DOCUMENTS

EP 0795824 9/1997

(Continued)

OTHER PUBLICATIONS

Serial Attached SCSI and Serial ATA Compatibility, Intel, 2002, pp. 1-8.

(Continued)

*Primary Examiner*—Joshua A Lohn
(74) *Attorney, Agent, or Firm*—Mattingly, Stanger, Malur & Brundidge, PC

(57) ABSTRACT

In a storage device incorporating a plurality of kinds of disk drives with different interfaces, the controller performs sparing on a disk drive, whose errors that occur during accesses exceed a predetermined number, by swapping it with a spare disk drive that is prepared beforehand.

16 Claims, 9 Drawing Sheets

U.S. PATENT DOCUMENTS

| | | |
|---|---|---|
| 5,867,736 A | 2/1999 | Jantz |
| 5,872,906 A | 2/1999 | Morita et al. |
| 5,875,120 A | 2/1999 | Matsushima et al. |
| 5,884,098 A | 3/1999 | Mason, Jr. |
| 5,918,059 A | 6/1999 | Tavallaei et al. |
| 5,937,433 A | 8/1999 | Lee et al. |
| 5,951,691 A | 9/1999 | Ng et al. |
| 6,052,791 A | 4/2000 | Chen et al. |
| 6,057,974 A | 5/2000 | Sukigara et al. |
| 6,061,750 A | 5/2000 | Beardsley et al. |
| 6,070,249 A | 5/2000 | Lee |
| 6,098,140 A * | 8/2000 | Pecone et al. ............... 710/311 |
| 6,108,748 A | 8/2000 | Ofek et al. |
| 6,115,797 A | 9/2000 | Kanda et al. |
| 6,137,679 A | 10/2000 | Chang |
| 6,154,850 A * | 11/2000 | Idleman et al. ................ 714/5 |
| 6,154,853 A | 11/2000 | Kedem |
| 6,173,360 B1 | 1/2001 | Beardsley et al. |
| 6,192,481 B1 | 2/2001 | Deenadhayalan et al. |
| 6,201,692 B1 | 3/2001 | Gamble et al. |
| 6,219,752 B1 | 4/2001 | Sekido |
| 6,219,753 B1 | 4/2001 | Richardson |
| 6,223,249 B1 | 4/2001 | Kato et al. |
| 6,233,691 B1 | 5/2001 | Atkinson |
| 6,240,486 B1 | 5/2001 | Ofek et al. |
| 6,282,602 B1 | 8/2001 | Blumenau et al. |
| 6,351,375 B1 | 2/2002 | Hsieh et al. |
| 6,400,730 B1 | 6/2002 | Latif et al. |
| 6,404,975 B1 * | 6/2002 | Bopardikar et al. ........... 386/46 |
| 6,418,539 B1 | 7/2002 | Walker |
| 6,449,709 B1 | 9/2002 | Gates |
| 6,484,236 B2 | 11/2002 | Fujimoto et al. |
| 6,484,269 B1 | 11/2002 | Kopylovitz |
| 6,502,108 B1 | 12/2002 | Day, III et al. |
| 6,510,491 B1 | 1/2003 | Franklin et al. |
| 6,530,035 B1 * | 3/2003 | Bridge ........................... 714/6 |
| 6,549,978 B2 | 4/2003 | Mansur et al. |
| 6,553,408 B1 | 4/2003 | Merrell et al. |
| 6,571,355 B1 * | 5/2003 | Linnell .......................... 714/9 |
| 6,583,947 B1 | 6/2003 | Hakamata et al. |
| 6,606,690 B2 | 8/2003 | Padovano |
| 6,628,469 B1 | 9/2003 | Hoyt |
| 6,628,513 B1 | 9/2003 | Gallagher et al. |
| 6,636,934 B1 | 10/2003 | Linnell |
| 6,640,278 B1 | 10/2003 | Nolan et al. |
| 6,651,137 B2 | 11/2003 | Baek et al. |
| 6,658,592 B1 | 12/2003 | Cohen et al. |
| 6,684,282 B1 | 1/2004 | Kocis |
| 6,684,295 B2 | 1/2004 | Fujimoto et al. |
| 6,708,232 B2 | 3/2004 | Obara et al. |
| 6,728,922 B1 | 4/2004 | Sundaram et al. |
| 6,745,287 B2 | 6/2004 | Fujimoto et al. |
| 6,763,409 B1 | 7/2004 | Elliott |
| 6,763,436 B2 | 7/2004 | Gabber et al. |
| 6,772,287 B2 | 8/2004 | Uchiyama et al. |
| 6,772,365 B1 | 8/2004 | Obara |
| 6,792,486 B1 | 9/2004 | Hanan et al. |
| 6,831,839 B2 | 12/2004 | Bovell |
| 6,834,326 B1 | 12/2004 | Wang et al. |
| 6,915,448 B2 | 7/2005 | Murphy et al. |
| 6,952,792 B2 * | 10/2005 | Emberty et al. ................ 714/5 |
| 7,103,798 B2 | 9/2006 | Morita |
| 7,363,345 B2 * | 4/2008 | Austin-Lane et al. ........ 709/207 |
| 7,421,517 B2 * | 9/2008 | Beckett et al. ................ 710/11 |
| 2001/0014956 A1 | 8/2001 | Nagata et al. |
| 2001/0019509 A1 | 9/2001 | Aho et al. |
| 2001/0046118 A1 | 11/2001 | Yamanashi et al. |
| 2001/0054136 A1 | 12/2001 | Ninomiya et al. |
| 2001/0056527 A1 | 12/2001 | Ninomiya et al. |
| 2002/0007469 A1 | 1/2002 | Taketa et al. |
| 2002/0019897 A1 | 2/2002 | Cruyningen |
| 2002/0034379 A1 | 3/2002 | Tanaka |
| 2002/0040413 A1 | 4/2002 | Okada et al. |
| 2002/0049886 A1 | 4/2002 | Furuya et al. |
| 2002/0062387 A1 | 5/2002 | Yatziv |
| 2002/0062454 A1 | 5/2002 | Fung |
| 2002/0069317 A1 | 6/2002 | Chow et al. |
| 2002/0069334 A1 | 6/2002 | Hsia et al. |
| 2002/0138705 A1 | 9/2002 | Suzuki et al. |
| 2002/0144048 A1 | 10/2002 | Bolt et al. |
| 2002/0144057 A1 | 10/2002 | Li et al. |
| 2002/0147945 A1 | 10/2002 | Fox et al. |
| 2002/0162048 A1 | 10/2002 | Ackaret et al. |
| 2002/0162057 A1 | 10/2002 | Talagala |
| 2003/0031187 A1 | 2/2003 | Heffernan et al. |
| 2003/0041201 A1 | 2/2003 | Rauscher |
| 2003/0041278 A1 | 2/2003 | Lin |
| 2003/0041283 A1 | 2/2003 | Murphy et al. |
| 2003/0046460 A1 | 3/2003 | Inoue et al. |
| 2003/0097487 A1 | 5/2003 | Rietze et al. |
| 2003/0097504 A1 | 5/2003 | Oeda et al. |
| 2003/0097607 A1 | 5/2003 | Bessire |
| 2003/0110330 A1 | 6/2003 | Fujie et al. |
| 2003/0115437 A1 | 6/2003 | Tomita |
| 2003/0131291 A1 | 7/2003 | Morrison et al. |
| 2003/0135577 A1 | 7/2003 | Weber et al. |
| 2003/0145167 A1 | 7/2003 | Tomita |
| 2003/0149840 A1 | 8/2003 | Bolt et al. |
| 2003/0163639 A1 | 8/2003 | Baum |
| 2003/0167439 A1 | 9/2003 | Talagala et al. |
| 2003/0172150 A1 | 9/2003 | Kennedy |
| 2003/0182502 A1 | 9/2003 | Kleiman et al. |
| 2003/0189811 A1 | 10/2003 | Peeke et al. |
| 2003/0193732 A1 | 10/2003 | Hakamata et al. |
| 2003/0196002 A1 | 10/2003 | Nakayama et al. |
| 2003/0196147 A1 | 10/2003 | Hirata et al. |
| 2003/0200473 A1 | 10/2003 | Fung |
| 2003/0204671 A1 | 10/2003 | Matsunami et al. |
| 2003/0212859 A1 | 11/2003 | Ellis |
| 2003/0217300 A1 | 11/2003 | Fukumori et al. |
| 2003/0221061 A1 | 11/2003 | El-Batal |
| 2003/0221077 A1 | 11/2003 | Ohno et al. |
| 2003/0231420 A1 | 12/2003 | Kano et al. |
| 2004/0010660 A1 | 1/2004 | Konshak et al. |
| 2004/0010662 A1 | 1/2004 | Aruga |
| 2004/0024930 A1 | 2/2004 | Nakayama et al. |
| 2004/0034731 A1 | 2/2004 | Sivertsen |
| 2004/0054939 A1 | 3/2004 | Guha et al. |
| 2004/0068610 A1 | 4/2004 | Umberger et al. |
| 2004/0068670 A1 | 4/2004 | Suzuki et al. |
| 2004/0068672 A1 | 4/2004 | Fisk et al. |
| 2004/0073747 A1 | 4/2004 | Lu |
| 2004/0078707 A1 | 4/2004 | Apperley et al. |
| 2004/0088482 A1 | 5/2004 | Tanzer et al. |
| 2004/0107325 A1 | 6/2004 | Mori |
| 2004/0111485 A1 | 6/2004 | Mimatsu et al. |
| 2004/0111560 A1 | 6/2004 | Takase et al. |
| 2004/0117517 A1 | 6/2004 | Beauchamp et al. |
| 2004/0117534 A1 | 6/2004 | Parry et al. |
| 2004/0128627 A1 * | 7/2004 | Zayas ............................ 716/1 |
| 2004/0139260 A1 | 7/2004 | Steinmetz |
| 2004/0148329 A1 | 7/2004 | Ogasawara et al. |
| 2004/0148460 A1 | 7/2004 | Steinmetz |
| 2004/0148461 A1 | 7/2004 | Steinmetz |
| 2004/0153614 A1 | 8/2004 | Bitner et al. |
| 2004/0162940 A1 | 8/2004 | Yagisawa et al. |
| 2004/0169996 A1 | 9/2004 | Paul et al. |
| 2004/0177218 A1 | 9/2004 | Meehan et al. |
| 2004/0193760 A1 | 9/2004 | Matsunami et al. |
| 2004/0193791 A1 | 9/2004 | Felton et al. |
| 2004/0199515 A1 | 10/2004 | Penny et al. |
| 2004/0221101 A1 | 11/2004 | Voorhees et al. |
| 2004/0225903 A1 | 11/2004 | Hirezaki et al. |
| 2004/0236908 A1 | 11/2004 | Suzuki et al. |

| | | | |
|---|---|---|---|
| 2004/0243386 | A1 | 12/2004 | Stolowitz et al. |
| 2004/0243761 | A1 | 12/2004 | Bohrer et al. |
| 2004/0250148 | A1 | 12/2004 | Tsirkel et al. |
| 2004/0267516 | A1 | 12/2004 | Jibbe et al. |
| 2004/0268037 | A1 | 12/2004 | Buchanan, Jr. et al. |
| 2004/0268069 | A1 | 12/2004 | Satoyama et al. |
| 2005/0027900 | A1 | 2/2005 | Pettey |
| 2005/0086557 | A1 | 4/2005 | Sato et al. |
| 2005/0097132 | A1 | 5/2005 | Cochran et al. |
| 2005/0117468 | A1 | 6/2005 | Kano et al. |
| 2005/0120263 | A1 | 6/2005 | Kano et al. |
| 2005/0120264 | A1 | 6/2005 | Kano et al. |
| 2005/0138154 | A1 | 6/2005 | Seto |
| 2005/0154942 | A1 | 7/2005 | Kano et al. |
| 2005/0188257 | A1* | 8/2005 | Morita .................. 714/13 |
| 2008/0127229 | A1* | 5/2008 | Keener et al. ........... 719/325 |

FOREIGN PATENT DOCUMENTS

| | | |
|---|---|---|
| EP | 0 844 561 | 5/1998 |
| EP | 1 001 345 A2 | 5/2000 |
| EP | 0 623 869 B1 | 1/2003 |
| EP | 1315074 | 5/2003 |
| JP | 02-188835 | 7/1990 |
| JP | 0218835 | 7/1990 |
| JP | 5100801 | 4/1993 |
| JP | 5150909 | 6/1993 |
| JP | 08-190762 | 7/1996 |
| JP | 09-251353 | 9/1997 |
| JP | 9330182 | 12/1997 |
| JP | 09330184 | 12/1997 |
| JP | 10-283123 | 10/1998 |
| JP | H10-301720 | 11/1998 |
| JP | 11-203057 | 7/1999 |
| JP | 2001-142650 | 5/2001 |
| JP | 2001/167040 | 6/2001 |
| JP | 2001/337868 | 12/2001 |
| JP | 2002-150746 | 5/2002 |
| JP | 2002-297320 | 10/2002 |
| JP | 2002297322 | 10/2002 |
| JP | 2002/333954 | 11/2002 |
| JP | 2002-333954 | 11/2002 |
| JP | 200336146 | 2/2003 |
| JP | 2004-178557 | 6/2004 |
| WO | 9950754 | 10/1999 |
| WO | 03/081416 A2 | 10/2003 |

OTHER PUBLICATIONS

ESG Product Brief EMC, Mar. 2003, CIARiiON With ATA, pp. 1-2.

EMC CLARiiON Backup Storage Solutions Back-up-to-Disk Guide with LEGATO Networker Diskbackup Option (DBO), Engineering White Paper, Apr. 8, 2003, pp. 1-28.

EMC CLARiiON Backup Storage Solutions Backup-to-disk Guide with Computer Associates BrightStor ARCserve Backup, Engineering White Paper, Apr. 16, 2003, pp. 1-28.

EMC CLARiiON Backup Storage Solutions Backup-to-Disk: An Overview, Engineering White Paper, Mar. 3, 2003, pp. 1-10.

EMC CLARiiON Backup Storage Solutions Backup-to-Disk Guide with CommVault Galaxy, Engineering White Paper, Mar. 3, 2003, pp. 1-26.

EMC CLARiiON Backup Storage Solutions Backup-to-Disk Guide with Computer Associates BrightStor Enterprise Backup, Engineering White Paper, Apr. 16, 2003, pp. 1-23.

IBM Technical Disclosure Bulletin vol. 38, No. 7, Jul. 1995 (New York), "Foreground/Background Checking of Parity in a Redundant Array of Independent Disks-5 Storage Subsystem", pp. 455-458.

Laboratory Automation and Information Management 32, 1996, (Elsevier Science B.V.), R E Dessey, "Computer Connections", pp. 53-62.

EMC 2-Gigabit Disk-Array Enclosure EMC Corporation (DAE2), FC and ATA Models, Hardware Reference P/N 014003048, Rev A02.

SGI InfiniteStorage TP9300S Storage Array, Data Sheet, available at: http://www.sgi.com/pdfs/3643.pdf.

Synetic Inc., SyneRAID -800SA, SCSI/Fibre-toSATA RAID Subsystem product information, available at: http://www.synetic.net/Synetic-Products/SyneRAID-Units/SyneRAID-800SATA/SyneRAID-800SA.html.

"SATA Disk System and Expansion of Unit offer 3.5 TB storage", Product News Network, Nov. 1, 2004.

Infortrend EonStor A16F-R1211/S1211 FC-to-SATA RAID Subsystem productinformation, available at: http://www.infortrend.com/2_product/a16f-r(s)1211.asp.

Judd, Ian, "Device Services Interface", Online, Jun. 19, 1996, pp. 1-8.

"Veritas Volume Manager Storage Administrator 3.2, Administrator's Guide", Veritas Software Corporation, Online, Jul. 2001, pp. 1-184.

Adaptec FS4500 Fibre to SATA RAID, Data Sheet, available at:http://www.sunstarco.com/PDF%20Files/Adaptec%20FS4500%20SATA.pdf.

S. Gurumurthi, et al "Interplay of Energy and Performance for Disk Arrays Running Transaction Processing Workloads", Dept. of Computer Science and Engineering, The Pennsylvania State University, and IBM Research Division, Thomas J. Watson Center, 10 pages.

* cited by examiner

ANOMALY NOTIFICATION CONTROL IN DISK ARRAY

CROSS-REFERENCE TO RELATED APPLICATION

The present application is a continuation of application Ser. No. 11/490,100, filed Jul. 21, 2006; which is a continuation of application Ser. No. 10/827,325, filed Apr. 20, 2004, now U.S. Pat. No. 7,103,798; which claims priority from Japanese application No. 2004-027490, filed on Feb. 4, 2004, the content of which are hereby incorporated by reference.

BACKGROUND OF THE INVENTION

The present invention relates to a disk array incorporating different kinds of disk drives. More specifically the present invention relates to a disk array which, in the event of a failure of a part of the disk drives, can perform sparing by using different kinds of disks and also to a sparing method.

A disk array accommodates a large number of disk drives. Should a part of these disk drives fail, a normal operation of the disk array cannot be guaranteed. As a means for improving a fault tolerance of the disk array, sparing may be used. The sparing involves preparing spare disk drives in a disk array in advance and, when a failure is detected, quickly disabling the failed disk drive and placing a spare disk drive in operation. After sparing is effected, an anomaly is notified to an administrator to prompt him to perform a maintenance service. By replacing the failed disk drive with a normal spare disk drive in this manner, the disk array can be maintained without stopping its operation.

JP-A-5-100801 discloses a technique which, when the number of access errors in a disk drive exceeds a predetermined value, disables the disk drive preventively before it fails and swaps it with a spare disk drive. JP-A-2002-297322 discloses a technique which, in the event of a failure, distributively stores data from the disabled disk drive in a plurality of spare disk drives.

SUMMARY OF THE INVENTION

There are a variety of kinds of disk drives with different characteristics, such as fibre channel disk drives with a fibre channel interface (hereinafter referred to as "FC disk drives") and serial disk drives with a serial interface (referred to as "SATA disk drives"). In a disk array, the use of different kinds of disk drives can not only take advantage of features of these disk drives but also compensate for their shortcomings. To perform sparing in such a disk array, it is desired that spare disk drives be prepared for each kind of disk drive.

However, there is a limit on the number of disk drives that can be installed in the disk array. Thus, in preparing spare disk drives for each kind a problem arises that a sufficient number of spare disk drives may not be available for each kind. With sufficient numbers of spares not available, a failure of even a small quantity of disk drives, which reduces the number of remaining spare disk drives, makes it necessary to perform maintenance service frequently, increasing a maintenance overhead, which should be avoided. Under these circumstances, the present invention enables sparing in a disk array incorporating different kinds of disk drives without causing an excessive increase in a maintenance overhead.

The present invention concerns a disk array which has installed in a disk array rack a plurality of disk drives and controllers for controlling data read/write operations to and from the disk drives, with the disk drives and the controllers interconnected with cables. In this disk array there are different kinds of disk drives with different characteristics. With this invention, whether a disk drive is to be disabled or not is decided by the controllers based on the number of errors that occur during the read/write operations in each disk drive. If it is decided that a certain disk drive be disabled, sparing processing is executed to allocate a part of disk drives as a spare for the disk drive that is going to be removed from service. The disk drives used for sparing may or may not be of the same kind as the disk drives to be disabled.

For example, the present invention provides a disk array comprising: a disk array rack; a plurality of disk drives installed in the disk array rack; a controller installed in the disk array rack to control data reads and writes to and from the disk drives; and cables connecting the controller with the disk drives; wherein the disk drives comprise first disk drives and second disk drives with an interface different from that of the first disk drives; wherein the controller, when it decides that one of the first disk drives fails, performs sparing on the failed first disk drives by using the second disk drives.

As a result of disabling a disk drive, the controller notifies the occurrence of the disabled state to a predetermined notification destination at a predetermined notification timing. In this invention the notification timing is set so that the notification resulting from the sparing performed between the disk drives of different kinds is issued earlier than the notification resulting from the sparing performed between the disk drives of the same kind. As an example, the anomaly notification may be issued immediately when the sparing is done between different kinds of disk drives but may be delayed a certain period of time when the sparing is done between the same kinds.

With this invention, by permitting sparing between different kinds of disk drives, it is possible to secure a sufficient number of disk drives that can be used as spares and thereby avoid the maintenance interval becoming short. However, the sparing between different kinds of disk drives may not be able to secure a sufficient performance due to a characteristic difference between these disk drives. Taking this problem into account, this invention advances the notification timing for the sparing between different kinds of disk drives to minimize performance reduction of the disk array.

In this invention it is preferred that the execution of the sparing between disk drives of the same kind be given priority over the execution of the sparing between different kinds. This can minimize a performance reduction of the disk array caused by sparing.

In this invention, the notification timing may be set based on at least the number of disabled disk drives or the number of disk drives available for the sparing. For instance, when the number of disabled disk drives exceeds a predetermined value or when the number of spares falls below a predetermined value, the anomaly notification may be issued. This eliminates a possibility of bringing about a situation in which the disk array is forced to be shut down because of unduly delayed notification.

In this invention, other failures than the disabled state in the disk array may be notified. In that case, if a failure other the disabled state should occur before the notification timing is reached, this failure may be notified along with the disabled state. This allows maintenance on a variety of failures to be performed at the same period, reducing the maintenance burden.

In this invention, when performing sparing between different kinds of disk drives, the allocation of disk drives may be controlled so as to compensate for a characteristic difference between different kinds of disk drives. In the case of sparing between FC disk drives and SATA disk drives, for example, a failed FC disk drive may be subjected to sparing by parallelly assigning a plurality of SATA disk drives. Parallel assignment means an arrangement that allows parallel accesses to the plurality of disk drives. Generally, SATA disk drives have a slower access speed than FC disk drives. The parallel allocation therefore can prevent a reduction in access speed.

Conversely, when a serial disk drive is disabled, a plurality of fibre channel disk drives may be serially assigned. Generally, FC disk drives have a smaller capacity than SATA disk drives. By serially assigning the FC disk drives, it is possible to minimize a capacity reduction as a result of sparing.

This invention can be applied to a variety of disk arrays, including one which incorporates a combination of FC disk drives and SATA disk drives. In this configuration, it is preferred that the disk array have a converter to convert a serial interface of each SATA disk drive into a fibre channel interface. This arrangement can transform the interfaces of various disk drives into a unified interface, i.e., the fibre channel.

Further, dual paths may be employed to improve a fault tolerance of the disk array. That is, a plurality of fibre channels may be formed by providing a plurality of controllers, interconnecting the controllers through fibre channel cables, and connecting each of the controllers with individual disk drives through the fibre channel cables. As to the SATA disk drives, dual paths can be formed by providing a selector which selects a connection destination of the SATA disk drives among a plurality of fibre channel loops.

This invention can be implemented not only as a disk array but also as an anomaly notification control method in a disk array. For example, an anomaly notification control method for controlling a notification of an anomaly that has occurred in a disk array may comprise: a disk array rack; a plurality of disk drives installed in the disk array rack; and a controller installed in the disk array rack to control data reads and writes to and from the disk drives; wherein the disk drives comprise a plurality of kinds of disk drives with different characteristics; wherein the controller executes: a decision step of evaluating errors that occur during reads and writes to and from each of the disk drives and deciding whether each disk drive needs to be disabled or not; a sparing control step of controlling sparing processing which, when it is decided that the disk drive needs to be disabled, assigns a part of the disk drives as spares for the disk drive to be disabled; and an anomaly notification step of notifying an occurrence of the disabled state to a predetermined notification destination at a predetermined notification timing; wherein the anomaly notification step may set the notification timing so that the anomaly notification resulting from the sparing processing performed between the disk drives of different kinds is issued earlier than the anomaly notification resulting from the sparing processing performed between the disk drives of the same kind.

Further, this invention may be implemented as a computer program for realizing such a control or as a computer-readable recording media that stores the computer program. The recording media may use a variety of computer-readable media such as flexible discs, CD-ROMs, magnetooptical discs, IC cards, ROM cartridges, punch cards, printed materials printed with bar codes, internal storage devices of computers (RAM and ROM) and external storage devices for computers.

Other objects, features and advantages of the invention will become apparent from the following description of the embodiments of the invention taken in conjunction with the accompanying drawings.

DESCRIPTION OF THE EMBODIMENTS

Figure 1:
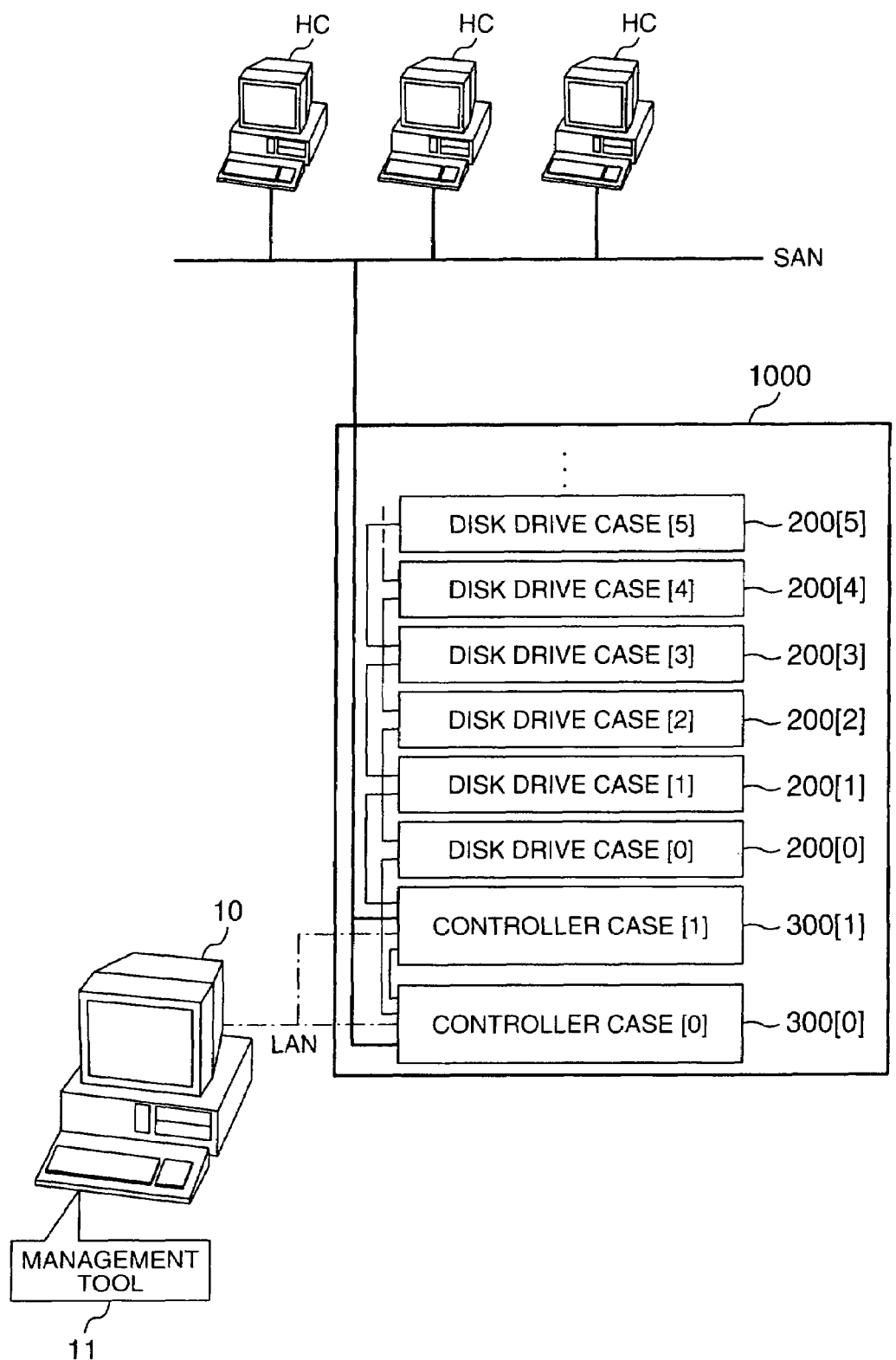
FIG. 1 is an explanatory diagram showing an outline configuration of an information processing system as one embodiment of this invention.

Embodiments of this invention will be described in the following order:
A. System configuration
B. Disk kind management processing
C. Sparing processing
　C1. Failure management table
　C2. Sparing processing
　C3. Failure notification processing A. System Configuration FIG. 1 is an explanatory diagram showing an outline configuration of an information processing system as one embodiment. The information processing system has a storage device 1000 connected with host computers HC via a storage area network (SAN). Each computer HC can access the storage device 1000 to implement a variety of information processing. A local area network (LAN) is connected with a management device 10, which may be a general-purpose personal computer with a network communication function and has a management tool 11, i.e., application programs installed in the computer for setting operations of the storage device 1000 and for monitoring the operating state of the storage device 1000.

Installed in a rack of the storage device 1000 are a plurality of disk drive cases 200 and controller cases 300. The disk drive cases 200 each accommodate a number of disk drives (or HDDs) as described later. The disk drives may be 3.5-inch disk drives commonly used in personal computers. The controller cases 300 accommodate controllers for controlling read/write operations on the disk drives. The controller cases 300 can transfer data to and from the host computers HC via the storage area network SAN and to and from the management device 10 via the local area network LAN. The controller cases 300 and the disk drive cases 200 are interconnected via fibre channel cables (or "ENC cables") on their back.

Though not shown, the storage device rack also accommodate AC/DC power supplies, cooling fan units and a battery unit. The battery unit incorporates a secondary battery that functions as a backup power to supply electricity in the event of power failure.

Figure 2:
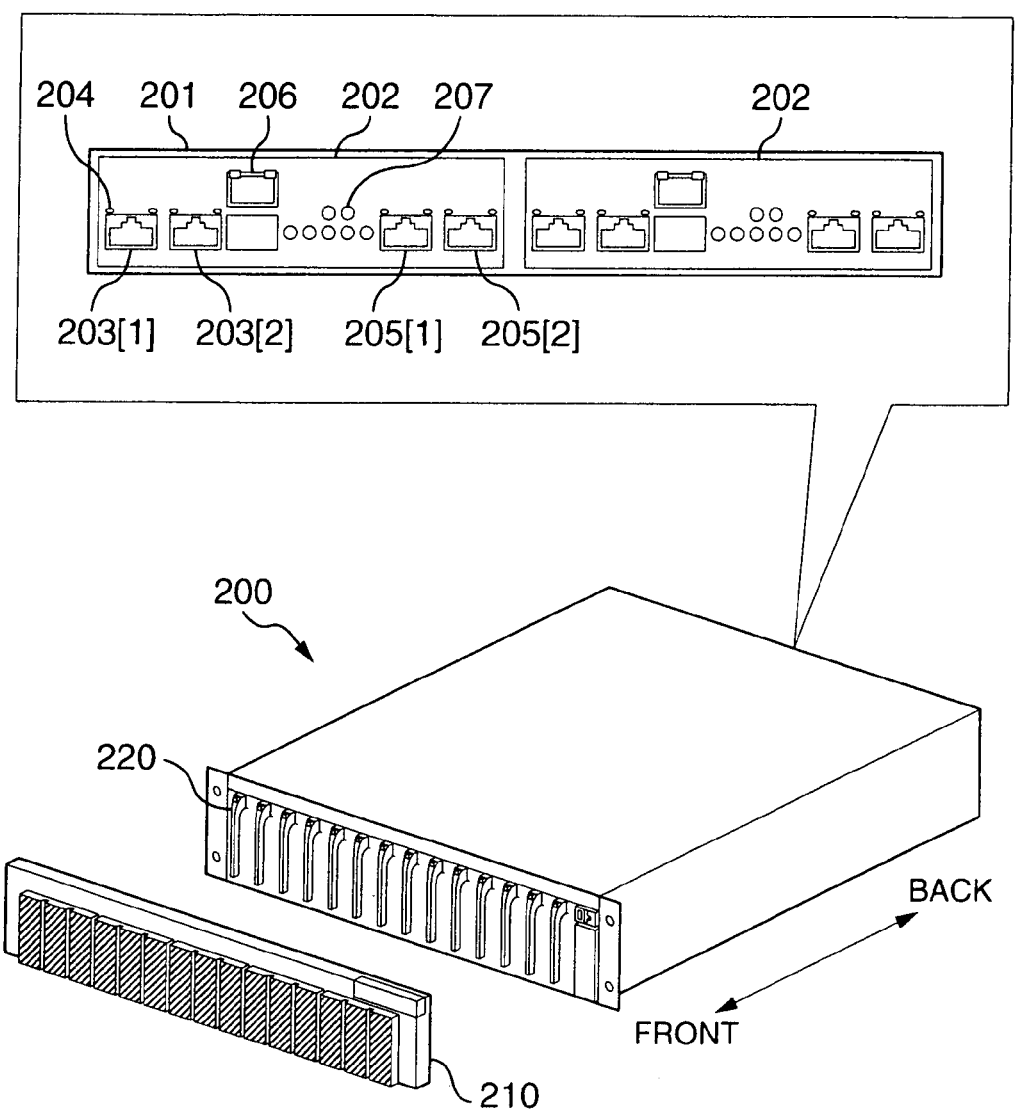
FIG. 2 is a perspective view of a disk drive case 200.

FIG. 2 is a perspective view of a disk drive case 200. It has a louver 210 attached to the front thereof and an array of disk drives 220 installed therein behind the louver. Each of the disk drives 220 can be removed for replacement by drawing it out forward. At the top of the figure is shown a connection panel arranged at the back of the disk drive case. In this embodiment, the disk drives 220 installed in the case 200 are divided into two groups for two ENC units 202, each of which has two input connectors 203 and two output connectors 205. Because two such ENC units 202 are installed in each disk drive case 200, a total of four input connectors 203 and four output connectors 205 corresponding to four paths (also referred to "FC-AL loops") are provided. Each connector has LEDs 204 at an upper part thereof. For simplicity of the drawing, reference number 204 is shown for only the LEDs of the connector 203[1]. The ENC units 202 may be provided with a LAN connector 206 for a LAN cable and LEDs 207 for indicating a communication status.

Figure 3:
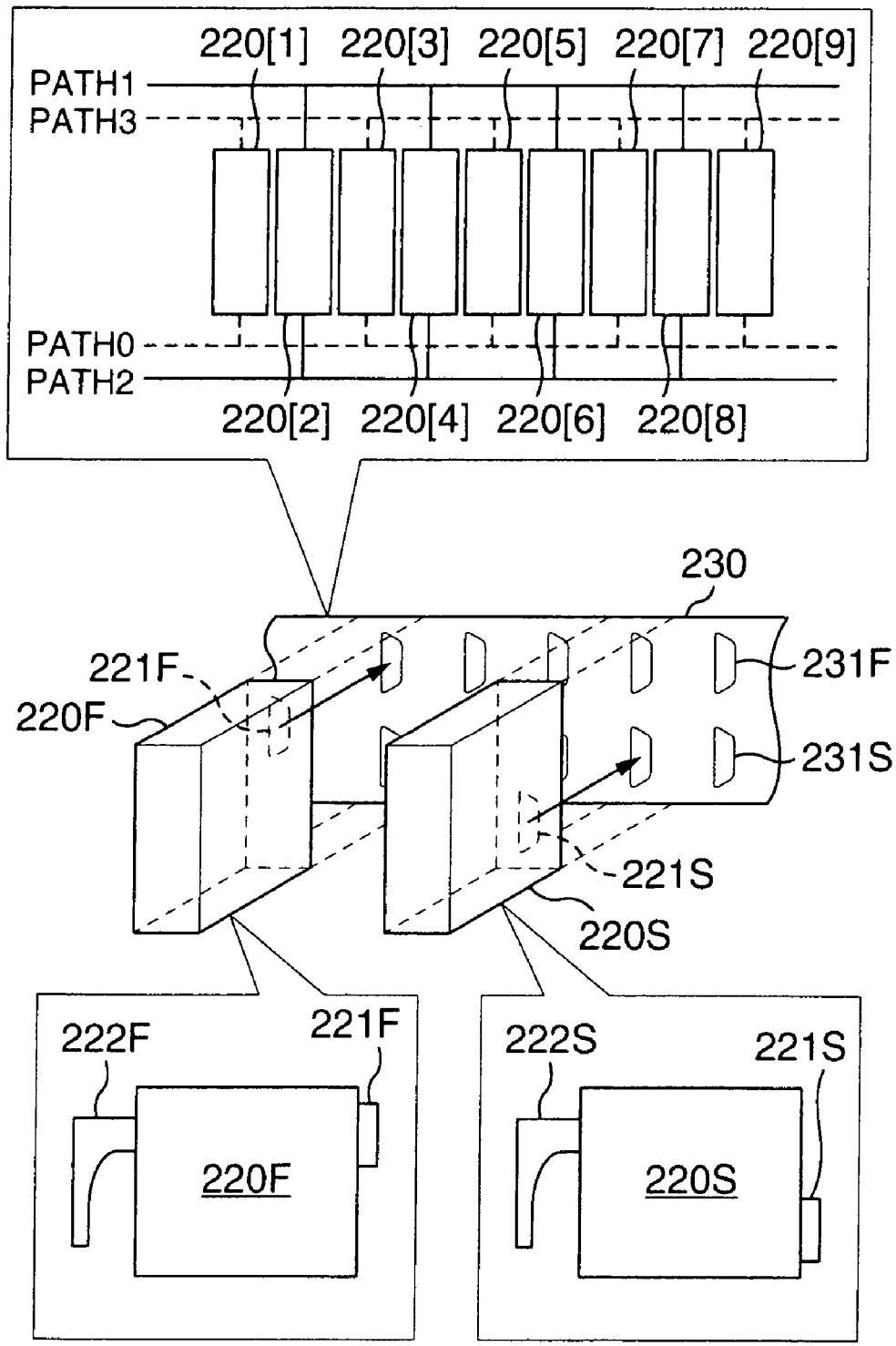
FIG. 3 is an explanatory diagram schematically showing an internal construction of the disk drive case 200.

FIG. 3 schematically illustrates an internal construction of the disk drive case 200. In this embodiment two kinds of disk drives 220 with different interfaces are used. One kind of disk drives 200F has a fibre channel interface (referred to as "FC disk drives") and the other kind of disk drives 220S has a serial interface (referred to as "SATA disk drives"). A circuit configuration that allows for the simultaneous use of different interfaces will be described later. When we refer simply to "disk drives 220" they signify disk drives in general without a distinction of an interface. When an interface distinction is made, reference symbols 220F is used for FC disk drives and 220S for SATA disk drives.

The above two kinds of disk drives have the following features. The FC disk drives 220F have dual ports and thus can perform reads and writes from two paths. They also have SES (SCSI Enclosure Service) and ESI (Enclosure Service I/F) functions specified in the SCSI 3 (Small Computer System Interface 3) standard. The SATA disk drives 220S are provided with a single port and do not have SES and ESI functions. It is noted, however, that this embodiment does not exclude the application of SATA disk drives 220S having these functions.

Shown at the bottom of the figure are side views of the disk drives 220F, 220S. These disk drives have handles 222F, 222S and connectors 221F, 221S for mounting on the disk drive case 200. The connectors 221F, 221 S are shifted in vertical position from each other.

As shown at a central part of the figure, the disk drive case 200 has at its back a backboard 230 fitted with arrays of connectors 231F, 231S for mounting the disk drives 220. The connectors 231 F are for the FC disk drives 220F and the connectors 231S are for the SATA disk drives 220S. The upper and lower connectors 231 F, 231S are paired at positions corresponding to the mounting positions of the disk drives 220 and arrayed in a horizontal direction. When the disk drives 220F, 220S are inserted into the disk drive case 200 from the front like a drawer, the connectors 221F, 221S of the disk drives connect to one of the connectors 31F, 231S of the backboard 230 according to their kind. By changing the connectors to which the disk drives 220 connect according to the disk drive kind, it is possible to realize a selective use of circuits that compensate for the interface difference, as described later. The connector difference may also be used for identifying the kind of each disk drive 220. Further, an arrangement may be made so that the kind of disk drive installed is identifiable from outside. For example, a color of indicator lamp may be changed according to the kind of a disk drive installed or to be installed.

When connected to the connectors, the disk drives 220 are connected to four paths Path0-Path3. In this embodiment, the disk drives 220 connected to Path0, Path3 and the disk drives 220 connected to Path1, Path2 are alternated. This arrangement implements a dual path configuration in which each of the disk drives 220 can be accessed through two of the four paths. The configuration shown in FIG. 3 is just one example, and various other arrangements may be made in terms of the number of paths in the disk drive case 200 and the correspondence between the connectors and the disk drives 220.

Figure 4:
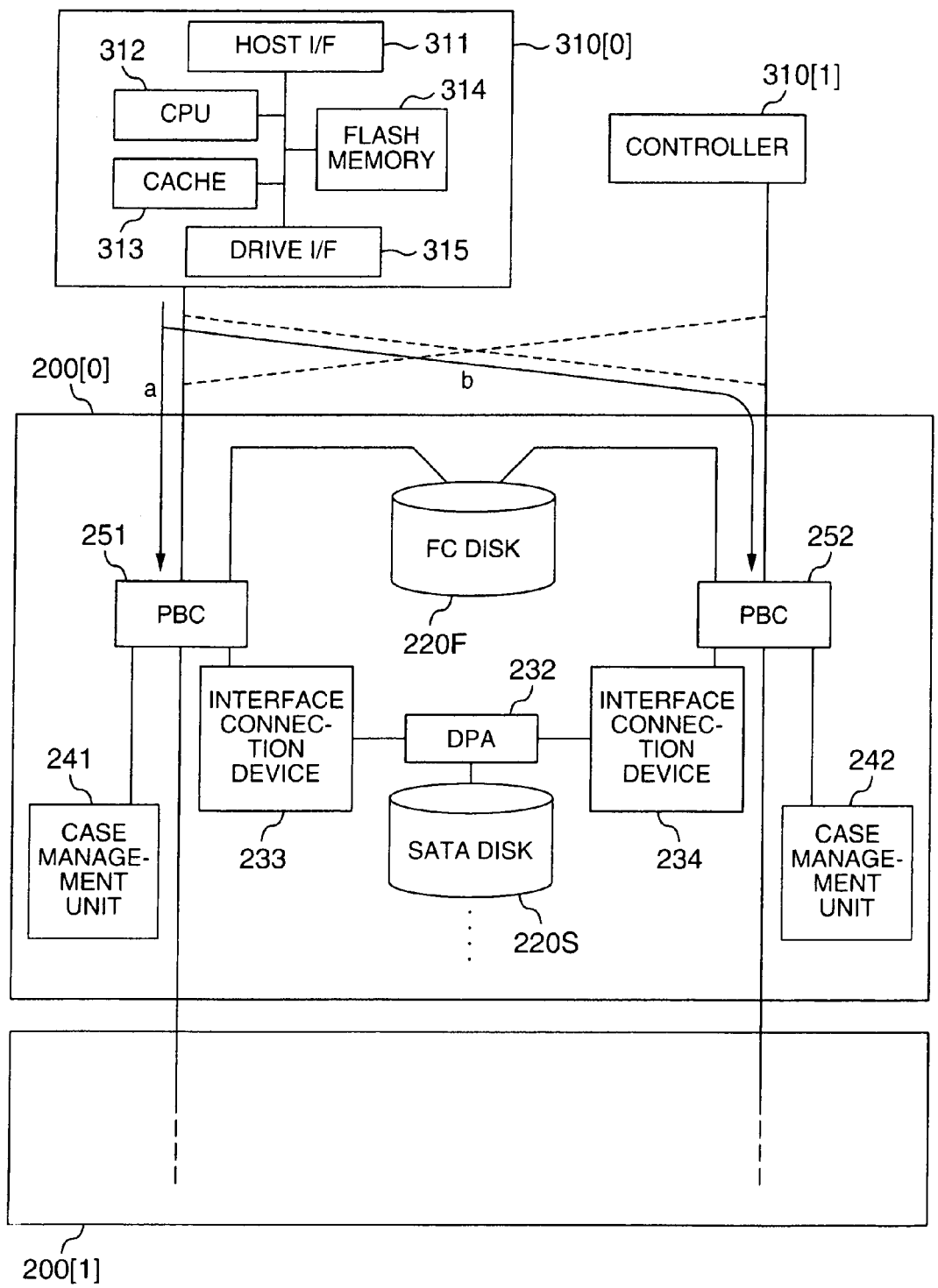
FIG. 4 is an explanatory diagram schematically showing an internal construction of a storage device 1000.

FIG. 4 schematically illustrates an internal construction of the storage device 1000. It shows an inner construction of a controller 310 incorporated in controller cases 300 and an inner construction of a disk drive case 200. The controller 310 has a CPU 312 and memories such as RAM and ROM. The controller 310 also has a host I/F 311 as a communication interface with host computers HC and a drive I/F 315 as a communication interface with disk drive cases 200. The host I/F 311 has a communication function conforming to the fibre channel standard, and the drive I/F 315 offers communication functions conforming to the SCSI and fibre channel standards. These interfaces may be provided for a plurality of ports.

The memories include a cache memory 313 for storing write data and read data written into and read from the disk drives 220 and a flash memory 314 (also called a shared memory) for storing various control software. The controller 310 has circuits for monitoring an AC/DC power status, monitoring states of the disk drives 220, controlling display devices on an indication panel and monitoring temperatures of various parts of the cases. These circuits are not shown.

In this embodiment, two controllers 310[0], 310[1] form the four paths Paths0-Path3 shown in FIG. 3. For the purpose of simplicity, FIG. 4 shows only two loops corresponding to a combination of Paths0 and Path3 or a combination of Path 1 and Path2. These controllers 310[0], 310[1] can switch their paths as shown by dashed lines. For example, the controller 310[0] can access each of the disk drives 220 through either of the two loops, as shown by arrows a, b in the figure. The same also applies to the controller 310[1].

The disk drive case 200 is connected with a plurality of disk drives 220 as described earlier. The FC disk drives 220F are connected to two FC-AL loops through port bypass circuits (PBCs) 251, 252.

The SATA disk drives 220S are connected to two FC-AL loops through a dual port apparatus (DPA) 232, interface connection devices (e.g., SATA master devices) 233, 234 and PBCs 251, 252. The DPA 232 is a circuit to make each of the SATA disk drives 220S dual-ported. The use of the DPA 232 makes the SATA disk drives 220S accessible from any of the FC-AL loops, as with the FC disk drives 220F.

The interface connection devices 233, 234 are circuits to perform conversion between the serial interface and the fibre channel interface. This conversion includes a conversion between a protocol and commands used to access the SATA disk drives 220S and a SCSI protocol and commands used in the fibre channel.

As described earlier, the FC disk drives 220F have a SES function whereas the SATA disk drives 220S do not. To compensate for this functional difference, the disk drive cases 200 are each provided with case management units 241, 242. The case management units 241, 242 are microcomputers incorporating a CPU, memory and cache memory and collect information on disk kind, address, operating state and others from the disk drives 220 contained in the disk drive case 200. The case management units 241, 242 are connected to two FC-AL loops via PBCs 251, 252 and, according to a SES command from the controller 310, transfers the collected information to the controller 310. In this embodiment, for the controller 310 to be able to retrieve management information in a unified manner regardless of the disk kind, the case management units 241, 242 collect management information not only from the SATA disk drives 220S but also from the FC disk drives 220F.

The PBC 251 switches the FC-AL loop among three devices connected to the FC-AL loop—the FC disk drive 220F, the interface connection device 233 and the case management unit 241. That is, the PBC 251, according to a command from the controller 310, selects one of the FC disk drive 220F, interface connection device 233 and case management unit 241 and connects it to the FC-AL loop, disconnecting the other two. Similarly, the PBC 252 switches the FC-AL loop among the three devices connected to the FC-AL loop, i.e., the FC disk drive 220F, interface connection device 234 and case management unit 242.

Because of the construction described above, the storage device 1000 of this embodiment has the following features. First, the function of the interface connection devices 233, 234 allows two kinds of disk drives—FC disk drives 220F and SATA disk drives 220S—to be installed in each disk drive case 200. Second, the function of the DPA 232 allows the SATA disk drives 220S to have dual ports. Third, the function of the case management units 241, 242 allows the controller 310 to collect management information also from the SATA disk drives 220S. These features are based on the construction described in connection with FIGS. 1-4 and not necessarily essential in this embodiment. In addition to the above-described storage device 1000, this embodiment can also be applied to storage devices of various constructions including those with a part of the above features excluded.

B. Management Processing by kind of disk

Figure 5:
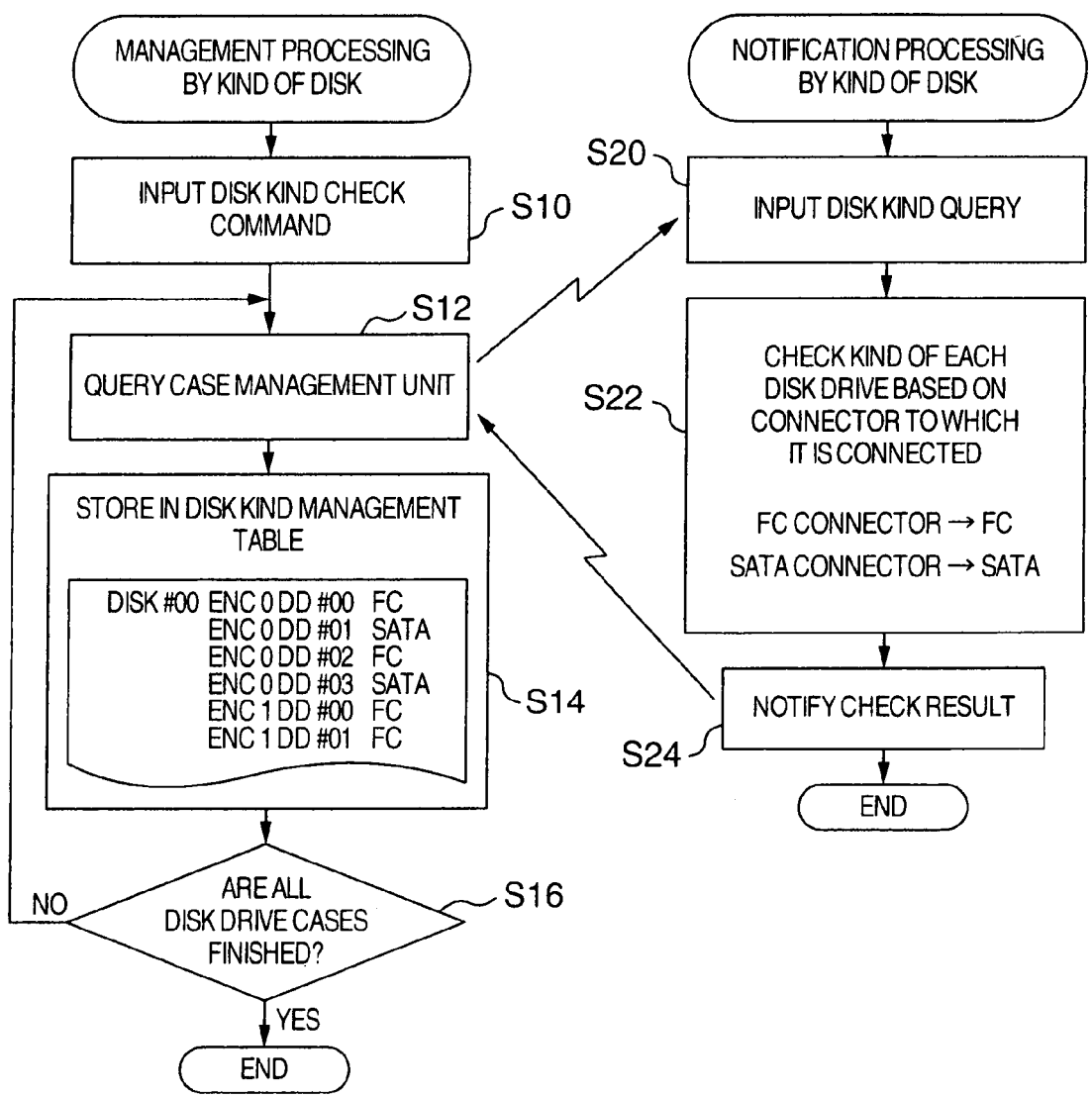
FIG. 5 is a flow chart of disk kind management processing.

FIG. 5 is a flow chart of the management processing by kind of disk to determine the kind of individual disk drives 220, i.e., whether the disk drive of interest is an FC disk drive 220F or a SATA disk drive 220S, and to manage them accordingly. On the left side of the flow chart is shown a sequence of steps executed by the controller 310. On the right side processing executed by the case management units 241, 242 is shown.

When this processing is started, the controller 310 inputs a disk kind check command (step S10). The check command may be issued explicitly by a user operating the controller 310 or management device 10, or an arrangement may be made to take the start of the storage device 1000 as a check command.

According to the check command, the controller 310 queries the case management units 241, 242 about the kinds of the disk drives 220 installed in each disk drive case 200. Upon receiving this query (step S20), the case management units 241, 242 identify the kind of each disk drive 220 by checking the connectors to which the individual disk drives 220 are connected. That is, if a disk drive 220 is connected to the connector 231F of FIG. 3, the disk drive is determined to be an "FC disk drive." If it is connected to the connector 231S, it is recognized as a "SATA disk drive." The case management units 241, 242 notify the check result to the controller 310 (step S24).

The above processing need only be performed by one of the case management units 241, 242 that have received the query from the controller 310. The case management units 241, 242 may also check and store the kinds of disk drives in advance and notify the controller 310 of the check result in response to the query.

Upon receipt of the disk kind check result from the case management units 241, 242, the controller 310 stores the check result in a disk kind management table (step S14). The disk kind management table is a table stored in the flash memory of the controller 310 to manage the kinds of individual disk drives 220. A content of the disk kind management table is shown in the flow chart. The disk drives 220 are identified by a combination of a disk drive case 200 number, an ENC unit 202 number and a unique address of each port. For example, a record at the top row of the table indicates that a disk drive 220 at an address "#00" in a disk drive case "#00"and an ENC unit "0" is an "FC disk drive."

The controller 310 repetitively executes the above processing for all disk drive cases (step S16) to identify the kinds of individual disk drives 220. With the above storage device 1000 of this embodiment, the controller 310 can easily identify and manage the kinds of disk drives even if the FC disk drives 220F and the SATA disk drives 220S are mixedly installed in each disk drive case 200. The controller 310 therefore can take advantage of the features of the FC disk drives 220F and the SATA disk drives 220S in controlling data reads and writes.

C. Sparing Processing

The disk kinds of disk drives that have been identified by the methods described above are utilized for the operation and management of the storage device 1000. One example of making use of the disk kind management information on disk drives is sparing. The sparing involves monitoring errors that occur during accesses to individual disk drives, disabling those disk drives which have a sign of impending failure and putting spare disk drives prepared in advance into service before the disk drives become inaccessible. After the sparing is performed, the controller 310 sends a failure notification to the management device 10 at a predetermined timing in order to prompt the maintenance of the disk drives.

For sparing, disk drives stored in the storage device 1000 are grouped into those that are RAID-controlled during normal operation and those that are not used during normal operation but as spares. A classification between the RAID use and the spare use is stored in a "failure management table" in the flash memory of the controller 310. The failure management table also manages the number of errors in each disk drive and an indication of whether sparing is being performed or not.

C1. Failure Management Table

Figure 6:
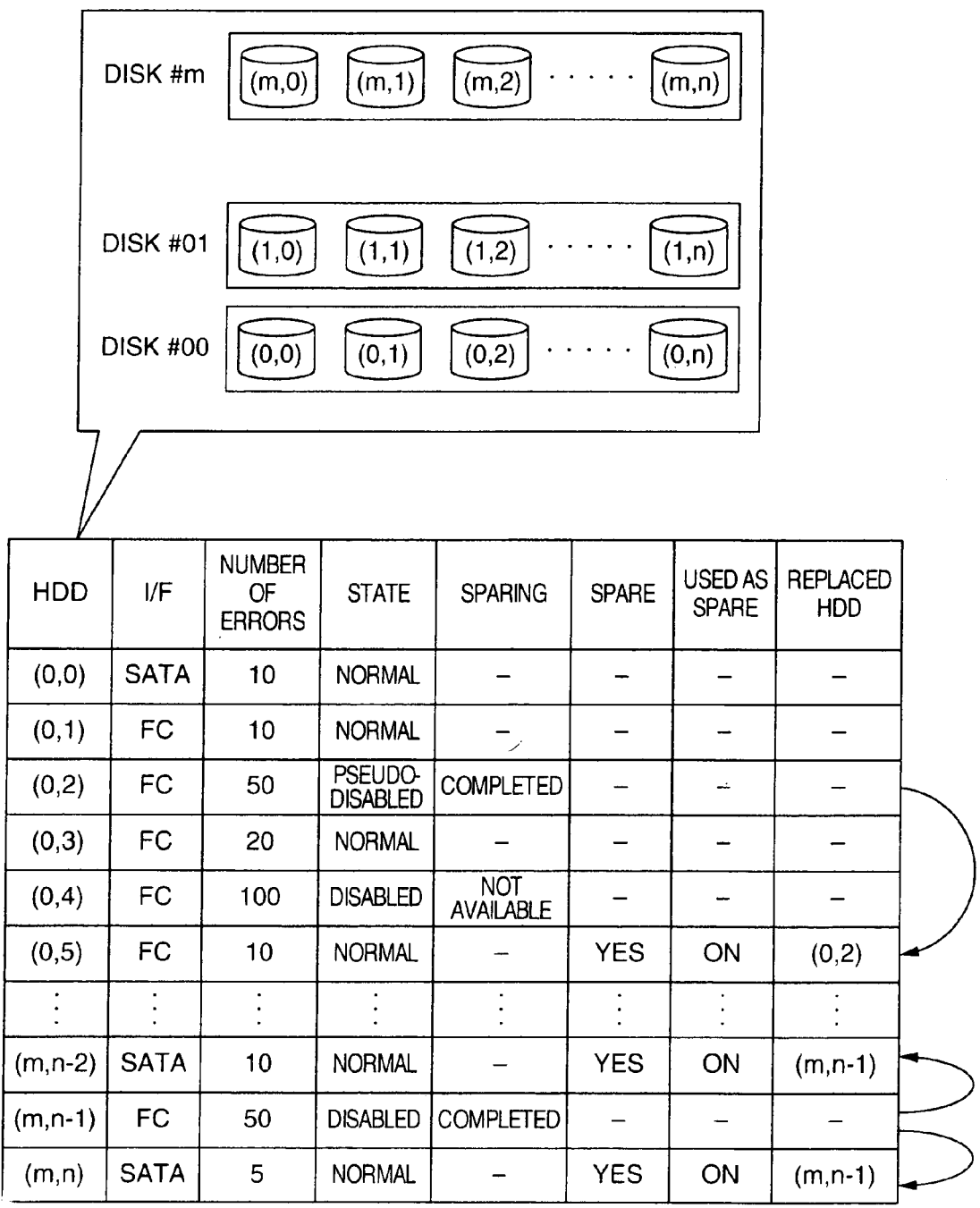
FIG. 6 is an explanatory diagram showing an example configuration of a failure management table.

FIG. 6 shows an example structure of a failure management table. This table records a variety of information about sparing for each disk drive (HDD). Since a plurality of disk drives are installed in each disk drive case (DISK#00-#m) as shown at the top of the figure, the failure management table represents disk drives in a two-dimensional arrangement (with a case number and a serial number in the case). As shown in the figure, disk drives installed in a disk drive case DISK#00 are represented as (0, 0)-(0, n).

Information recorded in the failure management table will be explained. "I/F" refers to a kind of interface of each disk drive, indicating whether the disk drive of interest is an FC disk drive or a SATA disk drive. "Number of failures" means the number of errors that took place during accesses. If this number exceeds 50, it is decided that the disk drive needs sparing. The number "50" is just one example and various other settings may be possible.

"Status" is represented in three states, "normal," "disabled" and "pseudo-disabled." The "disabled" state means a state in which a disk drive in question is replaced with another disk drive by sparing and removed from service. The "pseudo-disabled" state similarly means a state in which a disk of interest has undergone sparing and is removed from service. The pseudo-disabled state differs from the disabled state in that a failure notification is delayed whereas the disabled state results in an immediate notification of failure.

In this embodiment, when the disk drive sparing is performed between the same kinds of interface, this is treated as "pseudo-disabled." When the sparing is performed between different kinds of interface, this is treated as "disabled."

"Sparing" shows a result of sparing performed on a disk drive considered abnormal. "Completed" means that the sparing is completed normally. "Not available" means that sparing cannot be performed because there are no spare disk drives.

In the "spare" column, "yes" indicates that the disk drive can be used as a spare disk drive and "-" indicates that the disk drive is not a spare and is currently used for RAID. Disk drives for which "used as spare" is "ON" are currently in use for sparing. "Replaced HDD" refers to a disk drive that was found abnormal and replaced with a spare.

In the example shown, since a disk drive (0, 2) has reached the failure number of 50, it undergoes sparing and is replaced with a disk drive (0, 5). The disk drives (0, 2), (0, 5) are both FC disk drives, so the status of the disk drive (0, 2) is "pseudo-disabled." A disk drive (m, n−1) has reached the failure number of 50 and undergone sparing by which it is replaced with two disk drives (m, n−2), (m, n). Why two disk drives are used will be explained later. Since this sparing is between different interfaces, the status of the disk drive (m, n−1) is "disabled." A disk drive (0, 4) has reached a failure number of 100 but since no spare is available, the sparing field is indicated as "not available."

As described above, the controller 310 executes sparing by monitoring the operating state of each disk drive and using the failure management table. Processing executed by the controller 310 will be explained by referring to a flow chart.

C2. Sparing Processing

Figure 7:
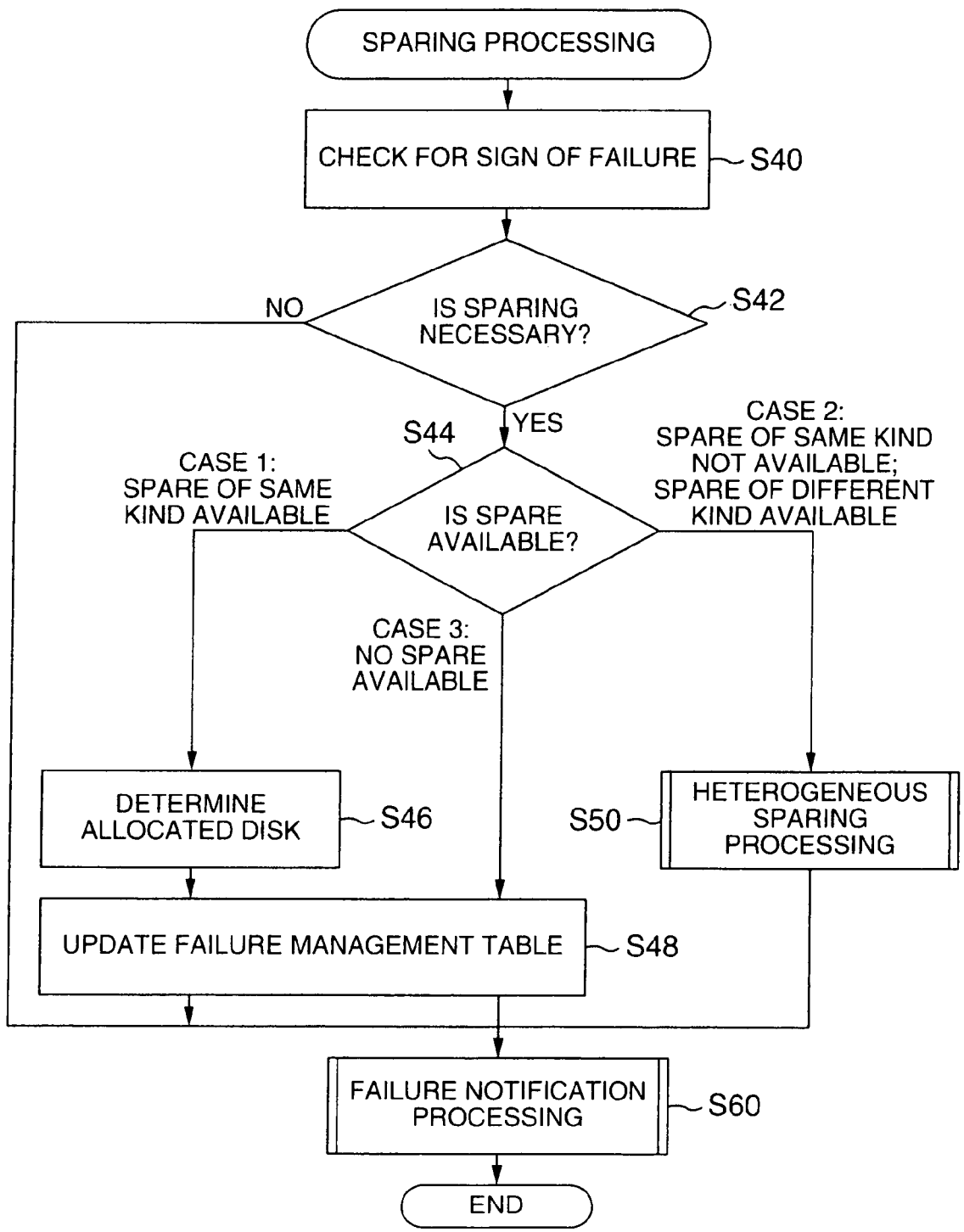
FIG. 7 is a flow chart of sparing processing.

FIG. 7 is a flow chart of sparing processing. This processing is executed repetitively by the controller 310 during an operation of the storage device 1000.

In this processing, the controller 310 monitors each disk drive 220 for a sign of possible failure, namely the number of errors that occur during accesses (step S40). When the number of errors exceeds a predetermined value, for example 50, the disk drive 200 of interest is showing a sign of failure and is decided as "having a failure possibility." This monitoring for a failure possibility is performed for each disk drive.

When a sign of failure is detected, the controller 310 decides that the disk drive in question needs sparing (step S42) and checks if there is any disk drive available for use as a spare (step S44). This check can be made by referring to the failure management table described earlier. It is desired that a RAID group of a plurality of disk drives be made up of those disk drives having the same kind of interface. Thus, when a disk drive fails and needs sparing, it is preferred to check an interface of the RAID group (also called ECC group) to which the failed disk drive belongs. Depending on a result of this check and the kind of spares available, the availability of spares falls into the following three cases:

Case 1: where spares of the same kind as the disk drive with a sign of failure are available;

Case 2: where spares of the same kind are not available but spares of different kinds are available; and Case 3: No spares are available.

According to the above classification, sparing with a different kind of disk drives is allowed but preceded in priority by the sparing with the same kind of disk drives. In the case 1, the controller 310 selects one of spares of the same kind for sparing (step S46) and updates the content of the failure management table (step S48). In this case, those disk drives with a sign of failure are "pseudo-disabled."

In the case 2, the controller 310 selects one of spares of a different kind and performs heterogeneous sparing (step S50). The heterogeneous sparing will be described later in detail because its processing is reverse to and differs from the processing performed when switching from an FC disk drive to SATA disk drive.

In the case 3, sparing is not performed but the failure management table is updated (step S48). A disk drive with a sign of failure is assigned a "not available" state in the field of sparing. With the above processing finished, the controller 310 performs failure notification processing according to the result of the finished processing, i.e., notifies the management device 10 of an impending failure (step S60) and exits the sparing processing.

Figure 8:
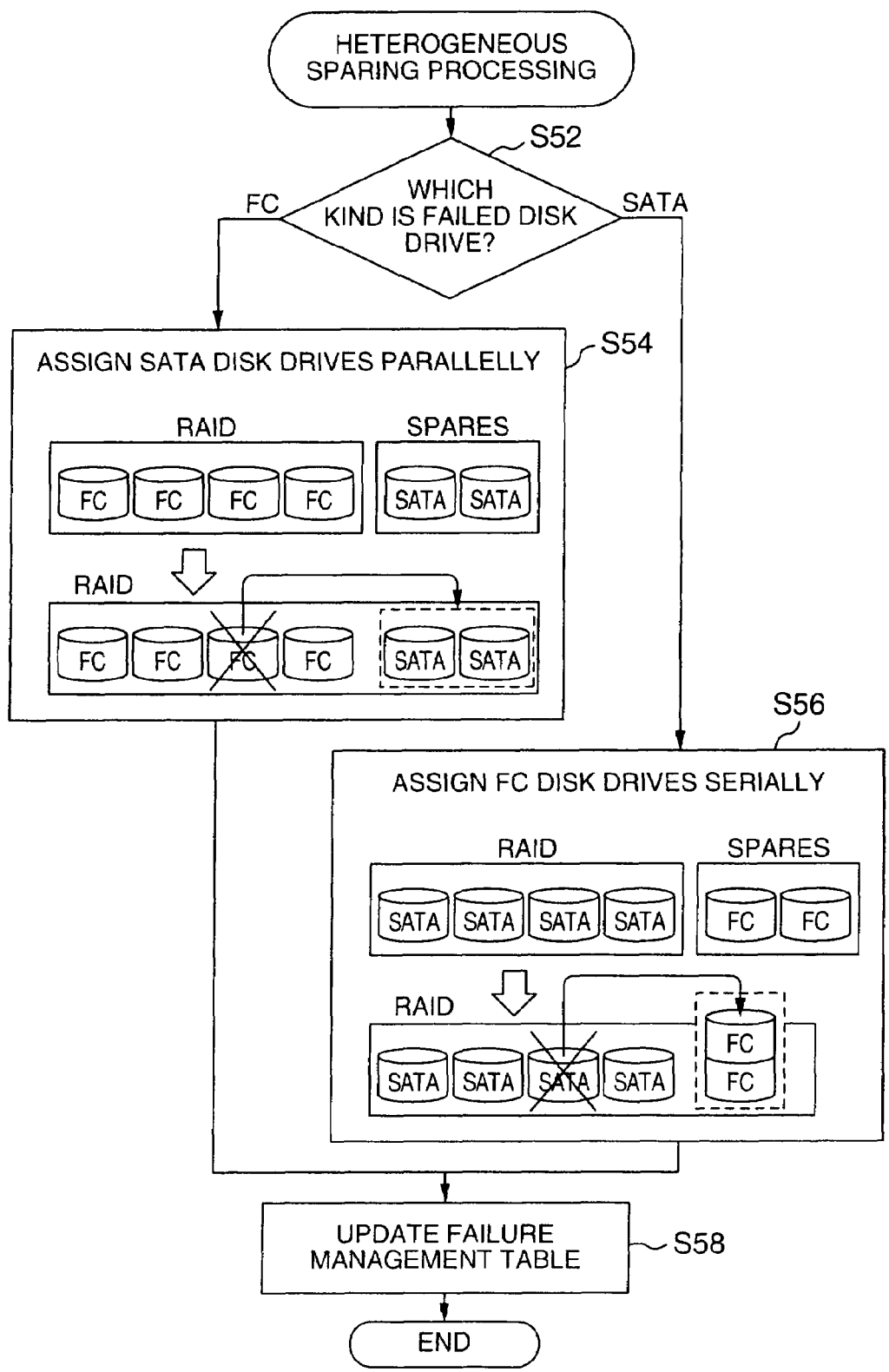
FIG. 8 is a flow chart of heterogeneous sparing processing.

FIG. 8 is a flow chart of heterogeneous sparing processing. This processing corresponds to the step S50 of FIG. 7 and performs sparing between an FC disk drive and a SATA disk drive. When this processing is started, the controller 310 checks the kind of a failed disk drive (step S52). In order to prevent sparing with disk drives having a different interface, a maintenance staff may make an appropriate setting in the failure management table in advance. If such a setting is made, heterogeneous sparing is not performed when spare disk drives of the same kind are not available.

When an FC disk drive has a sign of failure (step S52), the controller 310 executes sparing by replacing it with a plurality of parallel SATA disk drives (step S54). This sparing is schematically illustrated in FIG. 8. It is assumed that FC disk drives form a RAID with SATA disk drives standing by as spares. When in this condition one of the FC disk drives fails, the controller assigns two SATA disk drives parallelly. Assigning parallelly means storing data distributively in these drives so that the two SATA disk drives are accessed almost parallelly. It is also possible to assign three or more SATA disk drives for one FC disk drive.

Generally, an access speed for SATA disk drives is slower than that for FC disk drives. Thus, by allocating a plurality of SATA disk drives parallelly to one FC disk drive, it is possible to compensate for the access speed difference and minimize a reduction in performance of the storage device 1000 after sparing. Further, the SATA disk drives have lower reliability than the FC disk drives. Therefore, when sparing a FC disk drive with SATA disk drives, the same data on the FC disk drive may be copied to a plurality of SATA disk drives. That is, when sparing an FC disk drive with SATA disk drives, one of the spare SATA disk drives may be mirrored onto the other spare SATA disk drive.

When a SATA disk drive is failed (step S52), the controller 310 executes sparing by assigning a plurality of FC disk drives serially (step S56). This sparing procedure is schematically illustrated in the figure. It is assumed that SATA disk drives form a RAID with FC disk drives standing by as spares. When in this condition one of the SATA disk drives fails, the controller assigns two FC disk drives serially. Assigning serially means using the second FC disk drive after the first FC disk drive is full. It is also possible to assign three or more FC disk drives to one SATA disk drive.

Generally, the FC disk drives have a smaller disk capacity than the SATA disk drives. Thus, by assigning a plurality of FC disk drives serially to one SATA disk drive, it is possible to compensate for the capacity difference and minimize a reduction in performance of the storage device 1000 after sparing.

After executing the heterogeneous sparing in the procedure described above, the controller 310 updates the failure management table according to the result of sparing (step S58)

and exits the heterogeneous sparing processing. In this processing the disk drive found to be faulty is "disabled."

C3. Failure Notification Processing

Figure 9:
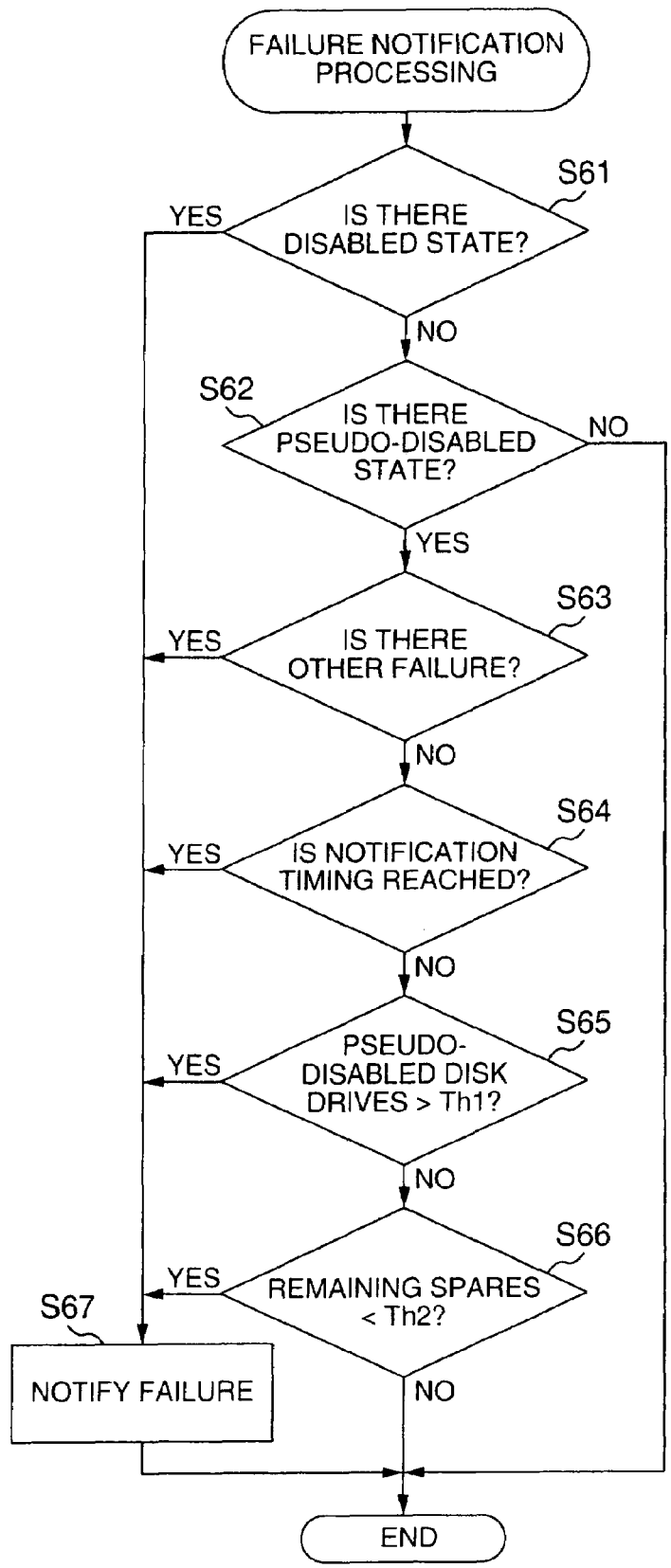
FIG. 9 is a flow chart of failure notification processing.

FIG. 9 is a flow chart of failure notification processing. This processing corresponds to step S60 of FIG. 7, in which the controller 310 controls a timing at which to give a failure notification to the management device 10.

In this processing, the controller 310 checks if there are any "disabled" disk drives (step S61). If a disabled disk drive exists, the controller 310 immediately executes the failure notification (step S67). The disabled state corresponds to a state of a failed disk when sparing is executed between different kinds of disk drives as explained earlier. However, such sparing cannot always compensate well for a performance difference between the different kinds of disk drives even if a plurality of spares are assigned as shown in FIG. 8. Therefore, the controller 310 immediately notifies the failure and prompts an execution of maintenance to avoid a performance degradation of the storage device 1000 as much as possible.

When a disabled disk drive does not exist (step S61), the controller 310 then checks for a "pseudo-disabled" disk drive (step S62). If such a disk drive does not exist, the controller 310 decides that there is no need for the failure notification and exits this processing.

If a pseudo-disabled disk drive exists (step S62), the controller postpones the failure notification until a predetermined condition is met. As described earlier, the pseudo-disabled state corresponds to a state of a failed disk drive when sparing is performed between disk drives of the same kind. Since such sparing guarantees the performance of the storage device 1000, delaying the failure notification does not in practice cause any trouble. This embodiment alleviates a load for maintenance by delaying the failure notification under such a circumstance.

If another failure to be notified exists (step S63), it is also notified along with the pseudo-disabled drive disk (step S67). The failure notification is also made (step S67) when a predetermined periodical notification timing is reached (step S64). Other timings for the failure notification include a timing at which the number of pseudo-disabled disk drives exceeds a predetermined value Th1 (step S65) and a timing when the number of remaining spares falls below a predetermined value Th2 (step S66). Taking these conditions into account can prevent the failure notification from being delayed excessively after a pseudo-disabled state has occurred.

With the storage device 1000 of this embodiment described above, because sparing between different kinds of disk drives is permitted, an effective use can be made of spares. This in turn can avoid a possible shutdown of the storage device due to a lack of available spares. Since failed disk drives are classified into the disabled and the pseudo-disabled state and the timing at which to issue a failure notification is controlled according to this failure state classification, it is possible to avoid performance degradation of the storage device 1000 and minimize a maintenance load. After sparing is executed using disk drives of a different kind, a user or maintenance staff, when replacing or adding disk drives, may perform sparing again using the same kind of disk drives as the disabled disk drives. For example, where a RAID group is made up of FC disk drives and a part of the FC disk drives fails and is spared with SATA disk drives, the user or maintenance staff, when replacing the failed (disabled) FC disk drives or adding FC disk drives, may spare the SATA disk drives with the new replacement FC disk drives. This procedure may be performed automatically or manually after the storage device recognizes the replacement or addition of the FC disk drives. Further, if any disk drives are spared with disk drives of a different kind, it is desirable to make this state recognizable on a display or from outside the disk drive case.

A variety of embodiments of this invention has been described above. It is noted, however, that the present invention is not limited to these embodiments and that various modifications may be made without departing from the spirit of the invention. For instance, the circuit for connecting SATA disk drives to the FC-AL and the DPA 32 and SATA master devices 233, 234 shown in FIG. 4 may be provided on the disk drive case 200 side. While in the embodiments the failure notification is made immediately after a disabled state occurs (step S61 in FIG. 9), this notification timing need not be "immediate" but can be set at any arbitrary timing which is not later than the notification timing of pseudo-disabled states.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk array system comprising:
   a controller, coupled to a host computer, and receiving/transferring data from/to said host computer;
   wherein said controller conducts a sparing process selected from at least four sparing processes, said at least four sparing processes including:
   a first sparing process storing data, corresponding to data stored in at least one of a plurality of first disk drives, in at least one spare disk drive using at least one second disk drive, said first disk drives coupled to said controller and storing data received from said host computer in accordance with controlling of said controller and each comprising a Fibre Channel (FC) interface, said second disk drive coupled to said controller and comprising a FC interface,
   a second sparing process storing data, corresponding to data stored in at least one of said first disk drives, in at least one spare disk drive using at least one third disk drive, said third disk drive coupled to said controller and comprising a Serial ATA (SATA) interface,
   a third sparing process storing data, corresponding to data stored in at least one of a plurality of fourth disk drives, in at least one spare disk drive using said second disk drive, said fourth disk drives coupled to said controller and storing data received from said host computer in accordance with controlling of said controller and each comprising a SATA interface, and
   a fourth sparing process storing data, corresponding to data stored in at least one of said fourth disk drives, in at least one spare disk drive using said third disk drive.

2. A disk array system according to claim 1, wherein in said third sparing process, said controller performs storing data, corresponding to data stored in said at least one of said fourth disk drives, in said at least one spare disk drive using said second disk drive based on error information of said at least one of said fourth disk drives.

3. A disk array system according to claim 1, wherein in said third sparing process, said controller stores data, corresponding to data stored in said at least one of said fourth disk drives, in said at least one spare disk drive using said second disk drive based on whether a number of errors is over a predetermined level, at least one of said errors occurring at a timing that said controller reads/writes data from/to said at least one of said fourth disk drives.

4. A disk array system according to claim 1, wherein said controller stores information of a drive type of each of said first disk drives, said second disk drive, said third disk drive and said fourth disk drives.

5. A disk array system according to claim 1, wherein said controller stores information that said third disk drive is at least one spare disk drive.

6. A disk array system according to claim 1, wherein said controller stores first information indicating that said third disk drive is at least one spare disk drive and second information indicating that a drive type of said third disk drive is a SATA disk drive.

7. A disk array system according to claim 1, wherein in said third sparing process, said controller controls to perform storing data, corresponding to data stored in said at least one of said fourth disk drives, in said at least one spare disk drive using said second disk drive, if said at least one of said fourth disk drives indicates a sign of implementing a failure.

8. A disk array system according to claim 1 wherein said fourth disk drives form a RAID group before performing storing data, corresponding to data stored in said at least one of said fourth disk drives, in said at least one spare disk drive using said second disk drive; and
in said third sparing process, said at least one spare disk drive using said second disk drive is related to said RAID group, if said data, corresponding to data stored in said at least one of said fourth disk drives, are stored in said at least one spare disk drive using said second disk drive.

9. A disk array system according to claim 1, wherein said controller forms a RAID group by using said fourth disk drives before said at least one of said fourth disk drives indicates a sign of implementing a failure; and
in said third sparing process, said controller relates said at least one spare disk drive using said second disk drive to said RAID group, if said at least one of said fourth disk drives indicates a sign of implementing a failure.

10. A disk array system according to claim 1, wherein said at least one of said fourth disk drives and another one of said fourth disk drives form a RAID group before conducting said third sparing process selected by said controller;
in said third sparing process, said at least one spare disk drive using said second disk drive is related to said RAID group, if said third sparing process selected by said controller is conducted; and
at least one new fourth disk drive and said another one of said fourth disk drives form said RAID group, if said at least one of said fourth disk drives is replaced to said at least one new fourth disk drive.

11. A disk array system according to claim 1, wherein said controller forms a RAID group by using said at least one of said fourth disk drives and another one of said fourth disk drives before said at least one of said fourth disk drives has a status of a failure;
in said third sparing process, said controller relates said at least one spare disk drive using said second disk drive to said RAID group, if said at least one of said fourth disk drives has said status of said failure; and
said controller form said RAID group by using at least one new fourth disk drive and said of said fourth disk drives, if said at least one of said fourth disk drives is replaced to said at least one new fourth disk drive.

12. A disk array system according to claim 1, wherein in said third sparing process, said controller controls to automatically perform storing data, corresponding to data stored in said at least one of said fourth disk drives, in said at least one spare disk drive using said second disk drive while said disk array system operates.

13. A disk array system comprising:
a controller coupled to a host computer and receiving/transferring data from/to said host computer;
wherein said controller conducts a selected sparing process among at least four sparing processes, said at least four sparing processes including:
a first sparing process storing data, stored in one or more of a plurality of first disk drives, in one or more spare storage areas using a storage area of one or more second disk drives, said plurality of first disk drives coupled to said controller and storing data received from said host computer in accordance with controlling of said controller and each comprising a Fibre Channel (FC) interface, said one or more second disk drives each comprising a FC interface,
a second sparing process storing data, stored in said one or more of said plurality of first disk drives, in one or more spare storage areas using storage a area of one or more third disk drives, said one or more third disk drives each comprising a Serial ATA (SATA) interface,
a third sparing process storing data, stored in one or more of a plurality of fourth disk drives, in one or more spare storage area using storage area of said one ore more second disk drives, said plurality of fourth disk drives coupled to said controller and storing data received from said host computer in accordance with controlling of said controller and each comprising a SATA interface, and
a fourth sparing process storing data, stored in said one or more of said plurality of fourth disk drives, in one or more spare storage areas using a storage of said one or more third disk drives.

14. A disk array system comprising:
a controller coupled to a host computer and controlling to receiving/transferring data from/to said host computer;
wherein said controller can conduct four sparing processes including:
a first sparing process storing data stored in at least one of a plurality of first disk drives, in at least one spare storage area using a storage area of at least one second disk drive, said plurailty of first disk drives coupled to said controller and storing data received from said host computer by controlling of said controller and each comprising a Fibre Channel (FC) interface, said second disk drive comprising a FC interface,
a second sparing process storing data stored in at least one of said plurality of first disk drives, in at least one spare storage area using a storage area of at least one third disk drive, said third disk drive comprising a Serial ATA (SATA) interface,
a third sparing process storing data, stored in at least one of a plurality of fourth disk drives, in at least one spare storage area using a storage area of at least one fifth disk drives, said plurality of fourth disk drives coupled to said controller and storing data received from said host computer by controlling of said controller and each comprising a SATA interface, said fifth disk drive comprising a FC interface, and
a fourth sparing process storing data, stored in at least one of said plurality of fourth disk drives, in at least one spare storage area using a storage area of at least one sixth disk drive, said sixth disk drive comprising a SATA interface.

15. A computer program stored on a computer readable storage medium and implemented in a controller of a disk array system coupled to a host computer, said computer program comprising:
- code controlling conducting a selected sparing process among at least four sparing processes, said at least four sparing processes including:
- a first sparing process storing data, stored in at least one of a plurality of first disk drives, in at least one spare disk drive using at least one second disk drive, said plurality of first disk drives storing data received from said host computer and each comprising a Fibre Channel (FC) interface, said second disk drive comprising a FC interface,
- a second sparing process storing data, stored in at least one of said plurality of first disk drives, in at least one spare disk drive using at least one third disk drive, said third disk drive comprising a Serial ATA (SATA) interface,
- a third sparing process storing data, stored in at least one of a plurality of fourth disk drives, in at least one spare disk drive using said second disk drive, said plurality of fourth disk drives storing data received from said host computer and each comprising a SATA interface, and
- a fourth sparing process storing data, stored in at least one of said plurality of fourth disk drives, in at least one spare disk drive using said third disk drive.

16. A computer program stored on a computer readabie storage medium and implemented in a controller of a disk array system coupled to a host computer, said computer program comprising: code conducting a sparing process selected from at least four sparing processes, said at least four sparing processes including:
- a first sparing process storing data, stored in at least one of a plurality of first disk drives, in at least one spare storage area using a storage area of at least one second disk drive, said plurality of first disk drives coupled to said controller and storing data received from said host computer in accordance with controlling of said controller and each comprising a Fibre Channel (FC) interface, said second disk drive comprising a FC interface,
- a second sparing process storing data, stored in at least one of said plurality of first disk drives, in at least one spare storage area using a storage area of at least one third disk drive, said third disk drive comprising a Serial ATA (SATA) interface,
- a third sparing process storing data, stored in at least one of a plurality of fourth disk drives, in at least one spare storage area using a storage area of at least one fifth disk drive, said plurality of fourth disk drives coupled to said controller and storing data received from said host computer in accordance with controlling of
said controller and each comprising a SATA interface, said fifth disk drive comprising a FC interface, and
- a fourth sparing process storing data, stored in at least one of said plurality of fourth disk drives, in at least one spare storage area using a storage area of at least one sixth disk drive, said sixth disk drive comprising a SATA interface.

\* \* \* \* \*